(12) United States Patent
Na et al.

(10) Patent No.: US 8,448,469 B2
(45) Date of Patent: May 28, 2013

(54) METHOD FOR MANUFACTURING FLOAT GLASS AND APPARATUS FOR MANUFACTURING THE SAME

(75) Inventors: Sang-Oeb Na, Seoul (KR); Kil-Ho Kim, Suwon-si (KR); Yang-Han Kim, Goyang-si (KR); Hyung-Young Oh, Busan Metropolitan (KR); Young-Sik Kim, Seoul (KR); Won-Jae Moon, Seoul (KR)

(73) Assignee: LG Chem, Ltd., Seoul (KR)

( * ) Notice: Subject to any disclaimer, the term of this patent is extended or adjusted under 35 U.S.C. 154(b) by 10 days.

(21) Appl. No.: 13/357,337

(22) Filed: Jan. 24, 2012

(65) Prior Publication Data

US 2012/0118017 A1 May 17, 2012

Related U.S. Application Data

(62) Division of application No. 12/677,073, filed as application No. PCT/KR2009/005658 on Oct. 1, 2009.

(30) Foreign Application Priority Data

Oct. 2, 2008 (KR) .............................. 2008-0097373

(51) Int. Cl.
*C03B 18/18* (2006.01)

(52) U.S. Cl.
USPC .......................................... 65/99.4; 65/182.3

(58) Field of Classification Search
USPC ............ 65/99.2, 99.3, 99.4, 182.3, 99.1–101, 65/157, 182.1–182.5, 187–206
See application file for complete search history.

(56) References Cited

U.S. PATENT DOCUMENTS

| | | | | |
|---|---|---|---|---|
| 3,337,319 A | * | 8/1967 | Edwards | 65/27 |
| 3,525,601 A | * | 8/1970 | Ohsato | 65/168 |
| 3,551,126 A | * | 12/1970 | Bodart et al. | 65/27 |
| 3,615,316 A | * | 10/1971 | Kita | 65/27 |
| 3,652,250 A | * | 3/1972 | Brichard | 65/182.3 |
| 4,012,216 A | * | 3/1977 | Marchand | 65/99.3 |
| 4,115,091 A | * | 9/1978 | Bourggraff et al. | 65/99.3 |
| 5,322,546 A | * | 6/1994 | Holsgrove et al. | 75/407 |
| 6,094,942 A | * | 8/2000 | Falleroni et al. | 65/99.2 |

FOREIGN PATENT DOCUMENTS

| | | | |
|---|---|---|---|
| JP | 2000-247658 | | 9/2000 |
| JP | 2000247658 A | * | 9/2000 |
| KR | 10-2003-0074262 A | | 9/2003 |

OTHER PUBLICATIONS

JP 2000247658 (Machine Translation) [online], [retrieved on Mar. 2, 2012], retrieved from PAJ Database (http://www19.ipdl.inpit.go.jp/PA1/cgi-bin/PA1INDEX).*

* cited by examiner

*Primary Examiner* — Richard Crispino
*Assistant Examiner* — Yana Belyaev
(74) *Attorney, Agent, or Firm* — McKenna Long & Aldridge, LLP

(57) ABSTRACT

The present invention provides a method for manufacturing a float glass by floating the glass on a molten tin that is contained in a molten tin bath, which includes the steps of a) discharging a portion of the molten tin in the molten tin bath to the outside of the molten tin bath; b) removing oxygen dissolved in the molten tin that is discharged from the molten tin bath by injecting an oxygen stripping gas that contains hydrogen into the molten tin; and c) returning the molten tin from which oxygen is removed to the molten tin bath, and an apparatus for manufacturing the same.

14 Claims, 3 Drawing Sheets

[Figure 1]
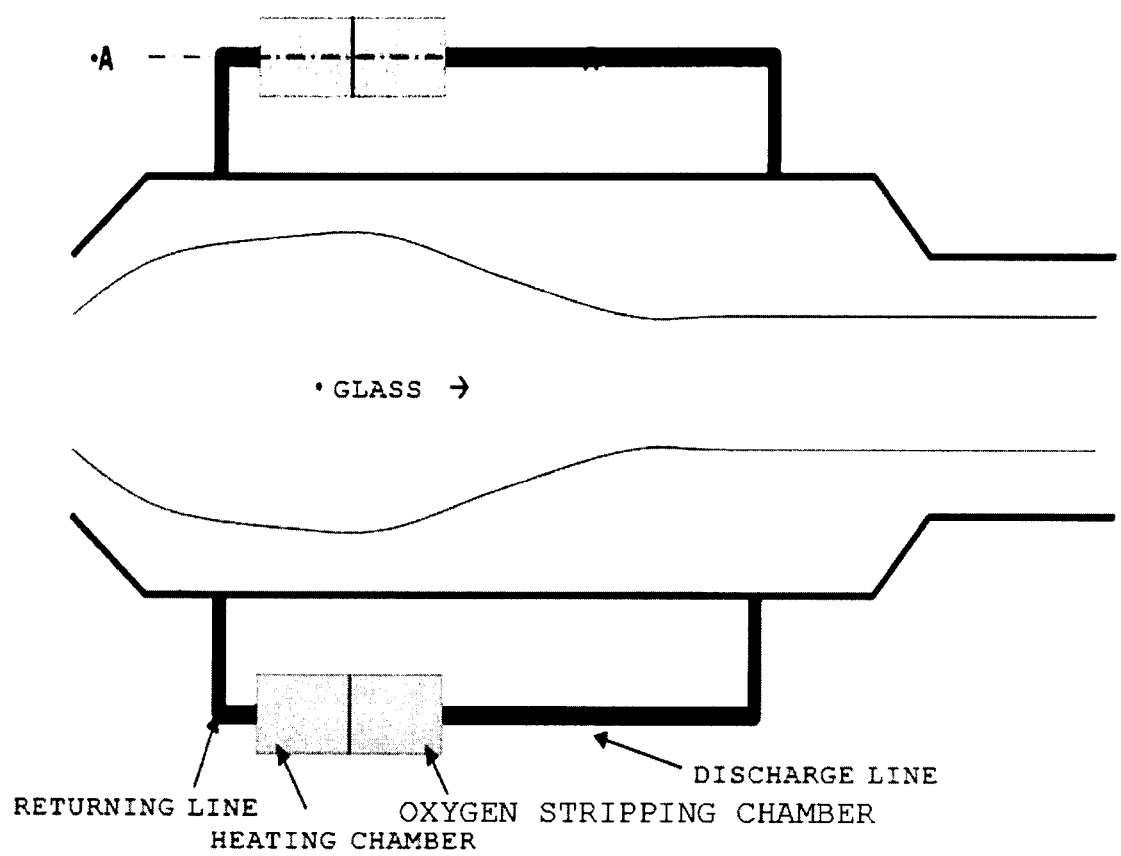

[Figure 2]
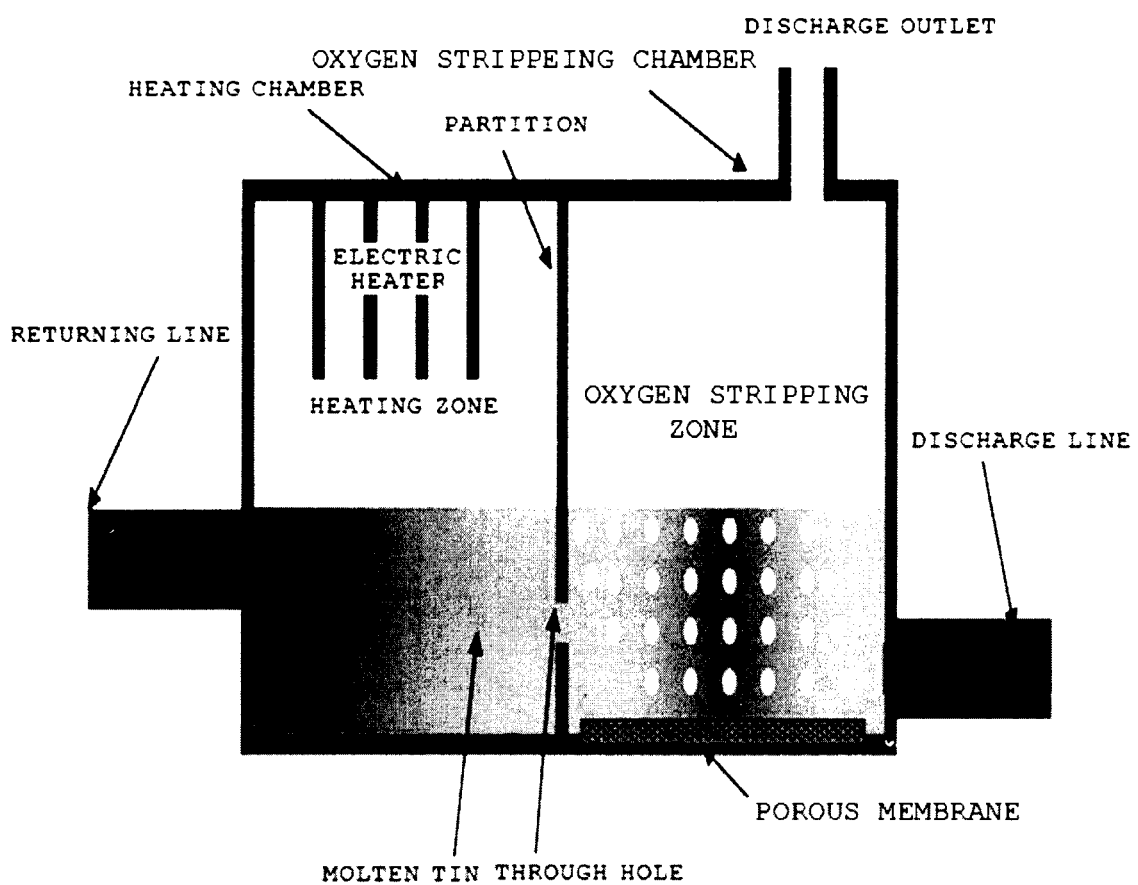

[Figure 3]
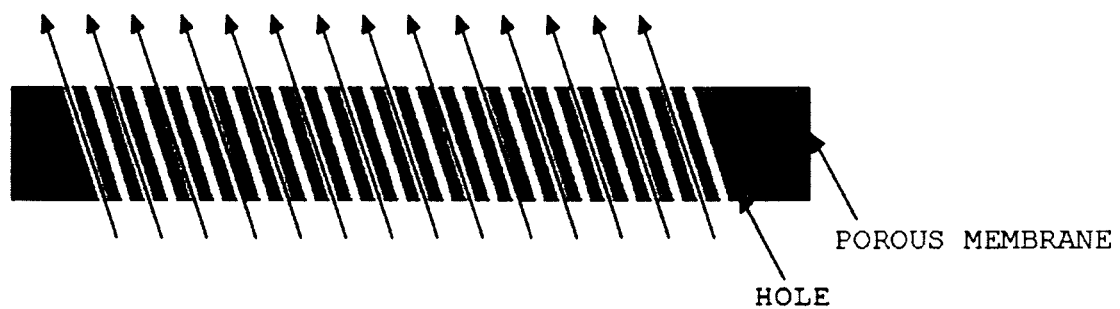

METHOD FOR MANUFACTURING FLOAT GLASS AND APPARATUS FOR MANUFACTURING THE SAME

This application is a divisional application of U.S. patent application Ser. No. 12/677,073, filed on Mar. 8, 2010, which is a national stage application of International Application No. PCT/KR2009/005658, filed Oct. 1, 2009, which claims priority to Korean Application No. 2008-0097373, filed Oct. 2, 2008, all of which are hereby incorporated by reference for all purposes as if fully set forth herein in their entireties.

TECHNICAL FIELD

The present invention relates to a method for manufacturing a float glass by floating glass on a molten tin included in a molten tin bath in which a dissolved oxygen amount in the molten tin bath can be reduced, and an apparatus for manufacturing the same.

BACKGROUND ART

A float glass is manufactured by using a typical float process. That is, by introducing the molten glass to an upper portion of molten tin that has the large specific gravity and is included in the molten tin bath to use a float process that manufactures a panel glass having no unevenness, it is manufactured.

However, when the panel glass is manufactured by using the molten tin bath, there is a large technical problem in a known manufacturing process in that there is a bottom open seed due to oxides of tin or oxygen dissolved in tin.

Therefore, in order to solve this, a technology in which an atmosphere of the molten tin bath is maintained under an atmosphere having no oxygen, and sealing is carried out so as to prevent inflow of air and consequently to prevent oxygen from being dissolved in tin has been developed. However, since this is not suitable to sufficiently remove oxygen that is dissolved in tin, there is a difficulty in reduction of product defect ratios.

DISCLOSURE

Technical Problem

It is an object of the present invention to provide a method for manufacturing a float glass by efficiently removing oxygen in the molten tin by an oxygen solubility difference according to temperature and an oxygen stripping gas including hydrogen with respect to a dissolved oxygen amount of a molten tin in a molten tin bath, such that product defects can be reduced, and an apparatus for manufacturing the same.

Technical Solution

The present invention provides a method for manufacturing a float glass by floating the glass on a molten tin that is contained in a molten tin bath, which includes the steps of a) discharging a portion of the molten tin in the molten tin bath to the outside of the molten tin bath; b) removing oxygen dissolved in the molten tin that is discharged from the molten tin bath by injecting such an oxygen stripping gas as hydrogen into the molten tin; and c) returning the molten tin from which oxygen is removed to the molten tin bath.

The present invention provides an apparatus for manufacturing a float glass by floating the glass on a molten tin that is contained in a molten tin bath, the apparatus comprising: a molten tin bath; a discharge line that is connected to an inside of the molten tin bath, and discharges a portion of the molten tin in the molten tin bath to the outside of the molten tin bath; an oxygen stripping chamber that is connected to the discharge line and receives the molten tin discharged from the molten tin bath through the discharge line; an injection device that is provided in the oxygen stripping chamber and injects the oxygen stripping gas including hydrogen to the molten tin in the oxygen stripping chamber; and a returning line that returns the molten tin from which oxygen is removed by the injection device to the molten tin bath.

Advantageous Effects

According to the present invention, a dissolved oxygen amount in a molten tin bath can be reduced. Therefore, such tin oxide-related defects as Tin Drop, Tin Pick-up and Top Speck, and Bottom open seed can be minimized.

DESCRIPTION OF DRAWINGS

FIG. 1 is a plan view of a molten tin bath according to the present invention;

FIG. 2 is a cross-sectional view of an oxygen stripping chamber and a heating chamber taken along the line A-A of FIG. 1; and FIG. 3 is a cross-sectional view of a porous membrane of FIG. 2.

BEST MODE

The present invention provides a method for manufacturing a float glass by floating the glass on a molten tin that is contained in a molten tin bath, which includes the steps of a) discharging a portion of the molten tin in the molten tin bath to the outside of the molten tin bath; b) removing oxygen dissolved in the molten tin that is discharged from the molten tin bath by injecting an oxygen stripping gas that contains hydrogen into the molten tin; and c) returning the molten tin from which oxygen is removed to the molten tin bath.

In the present invention, oxygen in the molten tin can be efficiently removed without an affection on manufacturing of the float glass in the molten tin bath by not directly performing a process for removing oxygen in the molten tin in the molten tin bath for manufacturing the float glass but performing the process at the outside of the molten tin bath.

In addition, the present invention is characterized in that it uses the oxygen stripping gas when oxygen is removed in the molten tin and simultaneously, uses a method for injecting oxygen stripping gas into the molten tin, not a method for simply contacting the oxygen stripping gas with the surface of the molten tin. As described above, the injection of the oxygen stripping gas into the molten tin may be more efficiently carried out by performing the removal of oxygen at the outside of the molten tin bath. That is, in the case of when the removal of oxygen is directly carried out in the molten tin bath, as described above, if the oxygen stripping gas is injected into the molten tin, it may affect the manufacturing of the float glass.

In the present invention, the oxygen stripping gas is not simply contacted with the surface of the molten tin, but oxygen may be more efficiently removed by directly injecting oxygen stripping gas into the molten tin. In more detail, in the case of when the oxygen stripping gas is simply contacted with the surface of the molten tin, since the contact surface between the oxygen stripping gas and the molten tin is small and the oxygen stripping gas is reacted with oxygen that is capable of being present under the atmosphere contacting with the molten tin before oxygen in the molten tin is removed, the oxygen removing efficiency is reduced. Accordingly, in the method according to the present invention, oxygen may be more efficiently removed as compared to a technology for simply contacting the oxygen stripping gas with the molten tin.

In the step a), the zone of the molten tin bath from which the molten tin is discharged is not limited, but in the zone at which the temperature of the molten tin is in the range of 700 to 1000° C. among the entire zone of the molten tin bath, the molten tin in the molten tin bath may be discharged. For example, in the cold zone of the molten tin bath at which the temperature of the molten tin in the molten tin bath is in the range of 600 to 800° C., the molten tin may be discharged. However, it is not limited thereto.

In the steps b), the oxygen stripping gas may have a flow rate in the range of 0.2 to 2 $Nm^3/hr$, a pressure in the range of 2 to 5 $kgf/cm^2$, and a temperature in the range of 300 to 500° C. Herein, the flow rate and the pressure are values that are set on the basis of the amount required in the reaction and the reference capable of passing through the porous layer, and at the above temperature, it is possible to prevent excessive cooling of the molten tin. However, it is not limited to the above flow rate, pressure and temperature conditions, and if necessary, it may be variously changed.

In the step b), the oxygen stripping gas may further include an inert gas. As the inert gas, nitrogen may be used. However, it is not limited thereto.

In the case of when pure hydrogen gas is used, hydrogen may be dissolved into the molten tin, and if the oxygen stripping gas including the inert gas in conjunction with the hydrogen gas ($H_2$) is used, it is possible to prevent the dissolving of the hydrogen gas into the molten tin. Herein, the inert gas may be discharged to the discharge outlet.

In the oxygen stripping gas of the step b), the mixing ratio of the inert gas and the hydrogen gas may be 90 or more and less than 100:more than 0 and 10 or less on the basis of the volume. Herein, in the case of when the inert gas is the nitrogen gas, the ratio of the nitrogen gas:hydrogen gas may be 90 or more and less than 100:more than 0 and 10 or less. Meanwhile, on the basis of the volume, the ratio of nitrogen gas:hydrogen gas may be 90 to 100:0 to 10.

In the step b), oxygen dissolved in the molten tin and hydrogen are chemically reacted to produce water ($H_2O$). Thus, oxygen that is included in the molten tin may be removed.

In addition, by lowering the temperature of the molten tin by the oxygen stripping gas having the relatively low temperature, the saturation solubility of oxygen that is included in the molten tin is reduced, such that a physical effect of extracting the dissolved oxygen is also generated.

When the oxygen stripping gas is contacted with the molten tin, in the case of when the oxygen stripping gas is bubbled, the extraction of the dissolved oxygen becomes more easy by the bubbling of the oxygen stripping gas. In detail, the bubbles of the oxygen stripping gas generated by the bubbling absorb oxygen dissolved in the molten tin to rise. As described above, the contact area with the molten tin may be increased by the bubbled oxygen stripping gas, such that the chemical removal of the dissolved oxygen in the molten tin can be more efficiently performed. That is, since water ($H_2O$) is generated by the reaction between oxygen in the molten tin and hydrogen, the removal of the dissolved oxygen can be more efficiently performed. Furthermore, the saturation solubility of the dissolved oxygen may be reduced by the cooling effect by the oxygen stripping gas, such that a physical function capable of extracting the dissolved oxygen may be more efficiently performed.

In the step b), the temperature of the bubbled molten tin may be in the range of 400 to 700° C.

In the step b), the reduced saturation solubility of oxygen may be tens ppm or less.

The saturation solubility of oxygen dissolved in the molten tin is described in the following Table 1.

TABLE 1

| Tc (° C.) | Solubility (%, $O_2$) |
|---|---|
| 536 | $6 \times 10^{-6}$ |
| 600 | $2 \times 10^{-4}$ |
| 700 | $6 \times 10^{-4}$ |

Herein, the solubility means the maximum oxygen saturation after bubbling which is the solubility (thermodynamic data) according to the temperature.

In the step c), after the molten tin from which oxygen is removed is heated, it may be returned to the molten tin bath.

The temperature of the heated molten tin may be in the range of 1200 to 1400° C. If the temperature is not sufficiently high, the operation stability of the return zone of the molten tin at which glass shaping starts may be reduced.

In the step c), the molten tin from which oxygen is removed may be returned into the zone at which the temperature of the molten tin is in the range of 1200 to 1400° C. of the entire zone of the molten tin bath.

The present invention provides an apparatus for manufacturing a float glass by floating the glass on a molten tin that is contained in a molten tin bath, the apparatus comprising: a molten tin bath; a discharge line that is connected to an inside of the molten tin bath, and discharges a portion of the molten tin in the molten tin bath to the outside of the molten tin bath; an oxygen stripping chamber that is connected to the discharge line and receives the molten tin discharged from the molten tin bath through the discharge line; an injection device that is provided in the oxygen stripping chamber and injects the oxygen stripping gas including hydrogen to the molten tin in the oxygen stripping chamber; and a returning line that returns the molten tin from which oxygen is removed by the injection device to the molten tin bath.

The discharge line may be connected with the zone at which the temperature of the molten tin is in the range of 700 to 1000° C. of the entire zone of the molten tin bath.

In order to lower the saturation solubility of oxygen dissolved in the molten tin by lowering the temperature of the molten tin in the oxygen stripping chamber so that oxygen dissolved in the molten tin is removed, the injection device may be a bubbling device that bubbles the oxygen stripping gas including hydrogen to the molten tin included in the oxygen stripping chamber.

The bubbling device may provide the oxygen stripping gas having a flow rate in the range of 0.2 to 2 $Nm^3/hr$, a pressure in the range of 2 to 5 $kgf/cm^2$, and a temperature in the range of 300 to 500° C.

The oxygen stripping gas may further include an inert gas. As the inert gas, nitrogen may be used. However, it is not limited thereto.

The mixing ratio of the inert gas and the hydrogen gas may be 90 or more and less than 100:more than 0 and 10 or less on the basis of the volume. Herein, in the case of when the inert gas is the nitrogen gas, the ratio of the nitrogen gas:hydrogen gas may be 90 or more and less than 100:more than 0 and 10 or less. Meanwhile, on the basis of the volume, the ratio of nitrogen gas:hydrogen gas may be 90 to 100:0 to 10.

The bubbling device may include a porous membrane and the porous membrane may be made of a ceramic material.

The hole of the porous membrane may be formed in a direction that is vertical in respects to a flat surface, and inclinedly formed in a unidirection (see FIG. 3).

If the hole of the porous membrane is inclinedly formed in a inclined line direction, since a rising locus of the bubbling oxygen stripping gas that passes through this may be longer than that in the case of the hole that is formed in a vertical direction, a rising path in the molten tin, that is, a reaction time of the bubbling oxygen stripping gas may increase.

In addition, by forming a flow capable of collecting the tin oxide rising to the surface of the molten tin to one portion, in the case of when the removal of the tin oxide finally rising is required, the tin oxide rising layer may be easily removed.

It may further include a gas supply line that is connected to the oxygen stripping chamber and supplies the oxygen stripping gas bubbled by the bubbling device into the oxygen stripping chamber.

The temperature of the molten tin in the oxygen stripping chamber, which is bubbled by the bubbling device, may be in the range of 400 to 700° C.

The saturation solubility of oxygen that is included in molten tin bubbled by the bubbling device may be tens ppm or less.

In the oxygen stripping chamber, oxygen dissolved in the molten tin and hydrogen are reacted to produce water ($H_2O$). Thus, oxygen that is included in the molten tin may be removed.

In the oxygen stripping chamber, a discharge outlet may be provided, through which water ($H_2O$) is discharged in a steam form to the outside of the oxygen stripping chamber.

The apparatus for manufacturing the float glass according to the present invention may further include a heating chamber including a heating device that is connected to the oxygen stripping chamber and heats the molten tin from which oxygen is removed in the oxygen stripping chamber.

In this case, the returning line may be provided to connect the heating chamber and the molten tin bath, and the molten tin heated in the heating chamber may be returned to the molten tin bath.

The temperature of the molten tin that is heated in the heating chamber may be in the range of 1200 to 1400° C.

The heating chamber and the oxygen stripping chamber may be separately provided and connected to each other. In addition, the heating chamber and the oxygen stripping chamber may be formed as an integrated body and the heating chamber and the oxygen stripping chamber may be divided by a partition.

In the partition, a through hole may be formed so that the molten tin from which oxygen is removed in the oxygen stripping chamber moves to the heating chamber.

The through hole may be formed in the partition so as to be disposed at a position that is lower than a liquid level of the molten tin included in the oxygen stripping chamber. It is preferable that the through hole is formed at a position where it is immersed in the molten tin.

Since the molten tin is bubbled in the oxygen stripping chamber, the temperature of the molten tin is lowered. Accordingly, tin oxide is generated on the surface and may rise. It is preferable that the through holes is lower than the liquid level of the molten tin, for example, the through hole is formed at a position where it is immersed in the molten tin, in order to prevent the rising tin oxide layer from moving to the heating chamber through the through hole.

For example, the through hole may be formed in the partition so as to be disposed at a predetermined height above the bottom surface of the chamber.

The returning line may return the molten tin from which oxygen is removed into the zone at which the temperature of the molten tin is in the range of 1200 to 1400° C. of the entire zone of the molten tin bath.

As described above, according to the method and the apparatus of the present invention, by using the method in which the oxygen stripping gas is injected to the molten tin to directly contact with tin, dissolved oxygen may be removed by the chemical reaction where water ($H_2O$) is generated by the reaction of oxygen in the molten tin and hydrogen, and dissolved oxygen in the molten tin may be discharged by a difference in solubility due to the oxygen stripping gas having the relatively low temperature. Therefore, a physical function in which dissolved oxygen amount in the molten tin bath is lowered occurs.

In particular, when the oxygen stripping gas is contacted with the molten tin, in the case of using the method for bubbling the oxygen stripping gas, the extraction of the dissolved oxygen becomes easier by the bubbling of the oxygen stripping gas. In detail, the bubbles of the oxygen stripping gas generated by the bubbling absorb oxygen dissolved in the molten tin to rise. As described above, since the contact area of the bubbled oxygen stripping gas and molten tin is increased, the chemical removal of dissolved oxygen in the molten tin, that is, the removal of oxygen according to th generation of water ($H_2O$) by the reaction between oxygen in the molten tin and hydrogen may be more efficiently performed. In addition, a physical function of extracting dissolved oxygen by lowering the degree of saturation of dissolved oxygen by the cooling effect by the oxygen stripping gas may be more efficiently performed.

Hereinafter, the present invention will be described in detail with reference to the accompanying drawings.

In order to remove oxygen that is dissolved in the molten tin in the molten tin bath, a stripping chamber that includes the oxygen stripping chamber and a heating chamber is provided on both sides of the molten tin bath of FIG. 1. In FIG. 1, two stripping chambers are correspondingly provided on both sides of the molten tin bath, but the number and the position of stripping chambers are not limited as shown in the drawing.

The molten tin inflow side of each stripping chamber is connected to the discharge line that supplies molten tin discharged from the molten tin bath to the inside of the oxygen stripping chamber.

The molten tin outflow side of each stripping chamber is connected to the returning line that connects the heating chamber that heats the molten tin from which oxygen is removed in the oxygen stripping chamber in an amount of a predetermined level or less, for example, several ppm or less of dissolved oxygen, and the molten tin bath.

The stripping chamber of FIG. 2 is a chamber that includes the oxygen stripping chamber and the heating chamber as an integrated body, and includes a partition, an oxygen stripping chamber and a heating chamber in which the oxygen stripping chamber and the heating chamber are divided by the partition.

The partition functions to separate the atmosphere of the oxygen stripping chamber and the atmosphere of the heating chamber so as to separate the atmosphere condition useful for oxygen removal and the atmosphere condition for suppressing reoxidation in the heating process of the molten tin from which oxygen is removed.

In the partition, the through hole through which molten tin from which oxygen is removed in the oxygen stripping chamber moves to the heating chamber is formed.

It is preferable that the through hole is formed in the partition so as to be disposed at a position that is lower than a liquid level of the molten tin included in the oxygen stripping chamber. As shown in FIG. 2, it is preferable that the through hole is formed at a position where it is immersed in the molten tin.

The oxygen stripping chamber is a zone that removes oxygen dissolved in molten tin discharged from the molten tin bath.

To one side of the oxygen stripping chamber, the discharge line that connects the molten tin bath and the oxygen stripping chamber is connected.

Herein, the position of the discharge line is not limited as long as it does not obstruct a flow of molten tin in the molten tin bath.

In the oxygen stripping chamber, a bubbling device that is capable of blowing the mixture gas of nitrogen ($N_2$) and hydrogen ($H_2$), that is, the oxygen stripping gas, into the oxygen stripping chamber is provided. In addition, a gas supply line (not shown) that supplies the mixture gas into the oxygen stripping chamber is provided so as to allow the mixture gas to pass through the bubbling device.

As long as the bubbling device is a porous membrane that has mechanical and chemical durability in respects to molten tin, it may be variously used.

For example, the porous membrane may be a porous ceramic plate that has a plurality of holes. Therefore, the mixture gas of nitrogen ($N_2$) and hydrogen ($H_2$) that is supplied to the inside of the oxygen stripping chamber passes through the hole of the porous ceramic plate.

The hole of the porous membrane, as shown in FIG. 3, may be formed inclinedly in an inclined line direction.

As described above, dissolved oxygen in the molten tin included in the oxygen stripping chamber can be chemically removed by the mixture gas of nitrogen ($N_2$) and hydrogen ($H_2$) that is bubbled by the bubbling device, that is, dissolved oxygen can be removed according to the generation of water ($H_2O$) by the reaction of oxygen in the molten tin and hydrogen, and there are performed physical functions in which dissolved oxygen is extracted by lowering the degree of saturation of dissolved oxygen by the cooling effect by the mixture gas introduced into the oxygen stripping chamber.

Water ($H_2O$) that is generated by the above process is converted into steam in an oxygen removing zone of the oxygen stripping chamber and discharged through the discharge outlet provided on the upper side of the oxygen stripping chamber.

The heating chamber is a heating zone heating molten tin that passed through the oxygen stripping chamber at a predetermined temperature or more, for example, 1200 to 1400° C. or more in order to adjust the temperature of molten tin from which oxygen is removed in the oxygen stripping chamber and the temperature of molten tin in the molten tin bath where glass is shaped.

In the heating chamber, a plurality of electric heaters are provided in order to heat molten tin.

Herein, the electric heater may be the same or similar electric heater in respects to the electric heater in the molten tin bath.

To one side of the heating chamber, a returning line that connects the molten tin bath and the heating chamber is connected.

It is preferable that the returning line is provided at a deep tin depth, for example, at a position where the depth is in the range of 70 to 100 mm and the temperature of the molten tin in the molten tin bath is in the range of 1200 to 1400° C., but the position thereof is not limited thereto as long as it does not obstruct a flow of molten tin in the molten tin bath.

As described above, according to the present invention, oxygen in the molten tin is efficiently removed by a difference in oxygen solubility according to the temperature and bubbling of the oxygen stripping gas including hydrogen, such that the dissolved oxygen amount of molten tin in the molten tin bath is reduced to several ppm or less, thereby lowering product defects.

The invention claimed is:

1. An apparatus for manufacturing a float glass by floating the glass on a molten tin that is contained in a molten tin bath, the apparatus comprising:
   a molten tin bath;
   a discharge line that is connected to a downstream zone of the molten tin bath, and discharges a portion of the molten tin in the molten tin bath to the outside of the molten tin bath;
   a stripping chamber including an oxygen stripping chamber that is connected to the discharge line and receives the molten tin discharged from the molten tin bath through the discharge line and a heating chamber integrally combined with the stripping chamber, and the stripping chamber being spatially divided to form the oxygen stripping chamber and the heating chamber by a partition having a through hole to transfer the molten tin from which oxygen is removed in the oxygen stripping chamber into the heating chamber;
   a bubbling device including a porous plate that is provided in the oxygen stripping chamber and bubbles the oxygen stripping gas including hydrogen through the porous plate into the molten tin in the oxygen stripping chamber; and
   a returning line that returns the molten tin from which oxygen is removed by the bubbling device to an upstream of the molten tin bath.

2. The apparatus for manufacturing a float glass as set forth in claim 1, wherein the bubbling device bubbles the oxygen stripping gas including hydrogen in the portion of the molten tin received in the oxygen stripping chamber so that a saturation solubility of oxygen dissolved in the portion of the molten tin is reduced by lowering the temperature of the portion of the molten tin in the oxygen stripping chamber to remove oxygen dissolved in the portion of the molten tin.

3. The apparatus for manufacturing a float glass as set forth in claim 2, wherein the bubbling device supplies the oxygen stripping gas at a flow rate in the range of 0.2 to 2 $Nm^3$/hr, a pressure in the range of 2 to 5 $kgf/cm^2$, and a temperature in the range of 300 to 500° C.

4. The apparatus for manufacturing a float glass as set forth in claim 2, wherein the oxygen stripping gas further includes an inert gas.

5. The apparatus for manufacturing a float glass as set forth in claim 4, wherein a mixing ratio of the inert gas and the hydrogen gas of the oxygen stripping gas is 90 or more and less than 100:more than 0 and 10 or less on the basis of the volume.

6. The apparatus for manufacturing a float glass as set forth in claim 2, further comprising:
   a gas supply line that is connected to the oxygen stripping chamber, and supplies the oxygen stripping gas that is bubbled by the bubbling device to the inside of the oxygen stripping chamber.

7. The apparatus for manufacturing a float glass as set forth in claim 2, wherein the temperature of the molten tin in the oxygen stripping chamber bubbled by the bubbling device is in the range of 400 to 700° C.

8. The apparatus for manufacturing a float glass as set forth in claim 1, wherein the porous plate has a plurality of holes.

9. The apparatus for manufacturing a float glass as set forth in claim 8, wherein the holes are inclined with respect to a flat surface of the porous plate.

10. The apparatus for manufacturing a float glass as set forth in claim 8, wherein the porous plate is made of a ceramic material.

11. The apparatus for manufacturing a float glass as set forth in claim 1, wherein in the oxygen stripping chamber, water ($H_2O$) is produced by reacting oxygen that is included in the molten tin and hydrogen with each other, such that oxygen dissolved in the molten tin is removed.

12. The apparatus for manufacturing a float glass as set forth in claim 11, wherein in the oxygen stripping chamber, a discharge outlet through which water ($H_2O$) is discharged in a steam form to the outside of the oxygen stripping chamber.

13. The apparatus for manufacturing a float glass as set forth in claim 1, wherein the temperature of the molten tin heated in the heating chamber is in the range of 1200 to 1400° C.

14. The apparatus for manufacturing a float glass as set forth in claim 1, wherein the through hole is disposed at a position that is lower than a liquid level of the molten tin received in the oxygen stripping chamber.

\* \* \* \* \*